Sept. 6, 1960                W. McCORKLE WOOD                 2,951,322
               AUTOMATIC PACKAGING MACHINE AND METHOD
                     OF FORMING A TUBE FROM A WEB
Filed Nov. 28, 1958                                      7 Sheets-Sheet 3

INVENTOR.
WILLIAM M. WOOD
BY
Lieber, Lieber & Nilles
ATTORNEYS

# United States Patent Office 2,951,322
Patented Sept. 6, 1960

2,951,322

AUTOMATIC PACKAGING MACHINE AND METHOD OF FORMING A TUBE FROM A WEB

William McCorkle Wood, Belle Glade, Fla., assignor to Laukhuff-Pratt Mfg. Corp., Milwaukee, Wis., a corporation of Wisconsin Filed Nov. 28, 1958, Ser. No. 777,017

17 Claims. (Cl. 53—28)

The present invention relates to an automatic packaging machine for making filled and sealed packages from a web of flexible thermoplastic material, which web is worked around a forming mandrel assembly by progressively guiding and forming it into a tube.

Prior art machines of this general character have been used in which guiding and/or forming chutes or tubular members are employed for continuously forming the tube, and which act as a funnel in diminishing the size of the bore in the feed direction to thereby form a longitudinal overlap seam which is subsequently sealed, for example, by a heated member.

Conventionally, the material to be packaged is fed into the formed tube through the inner former member which, in itself, usually takes the form of a tube. In other words, the web is drawn around the outside of an inner tubular forming member, through which member the material to be packaged is passed.

These prior art devices have several shortcomings, one of which is evident when it is attempted to package moist or wet produce, such as leafy vegetables. These wet vegetables are difficult to insert into and pass through these forming members and are also difficult to push through a tube of polyethylene, Pliofilm, or the like, and this has presented feeding problems in certain prior art machines.

Another shortcoming of some of these conventional machines is that the product is fed by gravity and usually involves a relatively long fall which results in the jamming or packing of the product during its travel from its storage bin to the finished bag. This packaging method results in a bruised or otherwise damaged product.

Still another shortcoming of prior art devices is in their requirement for a large amount of room in which to be set up and operated. The moving web of thermoplastic material requires a long distance in which it may be drawn and formed around its tubular forming members, filled, and subsequently sealed transversely at spaced locations along its length and cut off into individual containers.

Other prior devices cause creasing, waving, crimping or wrinkling of the web and finished package incident to pulling, feeding and forming the web to and about a former member. In an attempt to avoid these difficulties, other prior art devices have utilized transverse slits or notches at intervals along the web which require additional mechanism and result in a waste of material.

Accordingly, it is generally an object of the present invention to provide an improved automatic packaging machine which eliminates the above shortcomings of conventional machines.

In accordance with the present invention, an improved and highly efficient forming means is provided in which the direction of the web, as it is being formed into a tube, is reversed several times. The result is a compact forming means of particularly short length and which does not have any part thereof located within the finished tube. The product to be packaged may thus be placed directly into the finished tube and immediately upon the formation thereof.

Another object of the present invention is to provide an improved method for forming a webbing into a tube.

The invention further includes a reciprocating feed means for periodically pulling the web through the forming means, which feed means is actuated to initiate a complete packaging cycle simply by placing the product in the forming area.

In addition, the invention also contemplates automatically cycled means for making a longitudinal seal along the tube being formed, and for transversely sealing and substantially simultaneously cutting the tube.

These and other objects and advantages will appear later as this disclosure progresses, reference being had to the accompanying drawings, in which.

General operation

A web of heat-sealable material is drawn through a novel mandrel assembly and thereby formed into a tube. The means for pulling the web through the mandrel takes the form of a reciprocable carriage having gripping jaws which engage the tube at the discharge side of the mandrel and pull it therethrough. The act of placing the commodity in the tube being formed which is located within the mandrel causes the carriage to pull the web through the mandrel. While the tube is being pulled through the assembly, a longitudinal seal is formed along its length. When the gripper has pulled the tube through the mandrel to the length of bag desired, a transverse sealing means is then moved into engagement with the tube to form the end seal of the bag and a cut-off means then severs the finished and filled bag from the tube. The completed package then drops by gravity from the machine. The carriage and its gripper are then again automatically moved into position to grip the tube at the discharge end of the mandrel to thereby complete the cycle. The cycle is automatically repeated when another batch of the commodity is placed within that portion of the tube located in the mandrel.

Web feeding means

Referring in greater detail to the drawings, the machine includes a main frame 15 on which is rigidly mounted guide tracks 16 and 17 over which the gripper carriage 18 is reciprocable on its wheels 19 by the double-acting air motor 20 fixed to the frame 15. The piston rod 21 of the motor is connected to the upper part of the carriage and causes the latter to reciprocate therewith. A conventional solenoid operated valve 20a on the rear end of the motor causes the latter to extend or contract in the conventional manner, as will appear.

Figures 1, 1A:
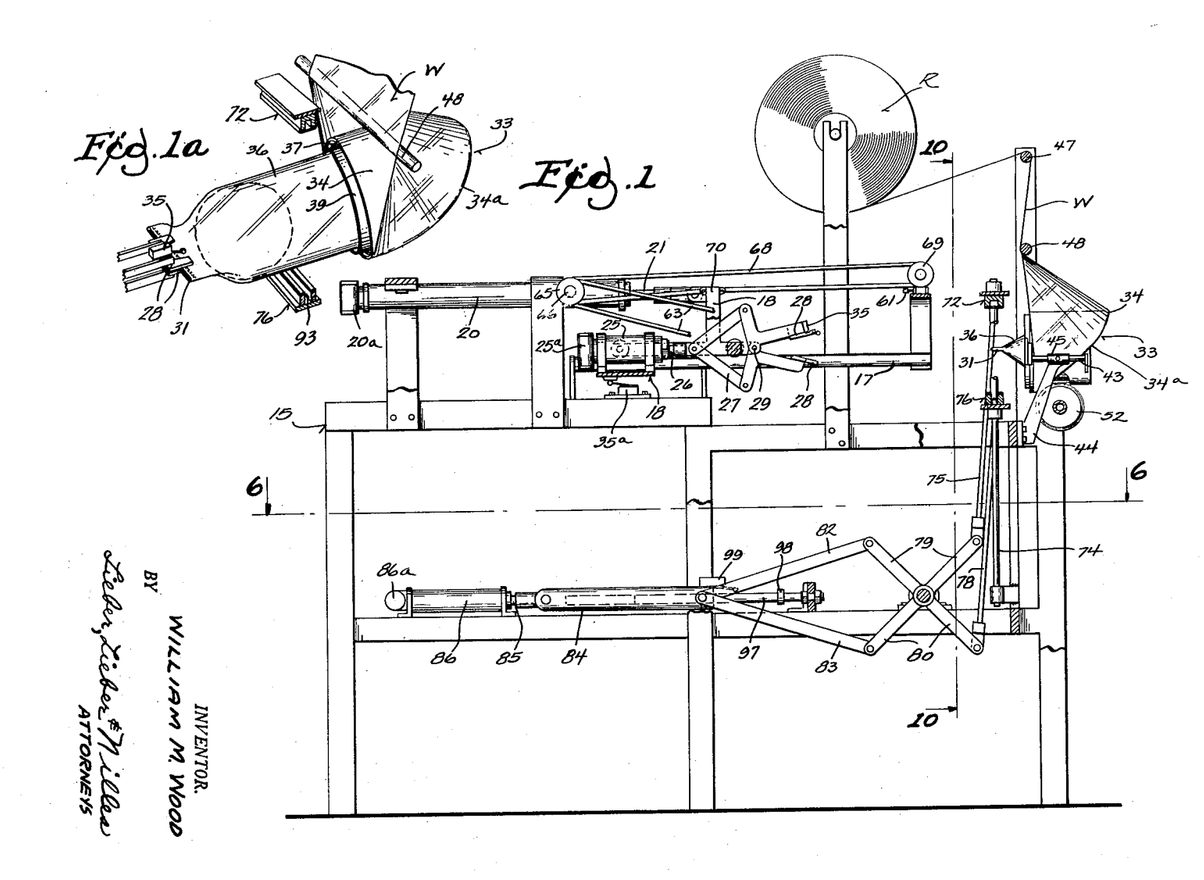
Figure 1 is a side elevational view of a packaging machine made in accordance with the present invention, certain parts being broken away, removed or shown in section for the sake of clarity.
Figure 1a is a perspective schematic view of certain of the parts of the machine of Figure 1 and showing a portion of the tubular material after the product has been loaded in, then pulled from the forming assembly and before the last end seal has been made.
Figures 2, 3, 4:
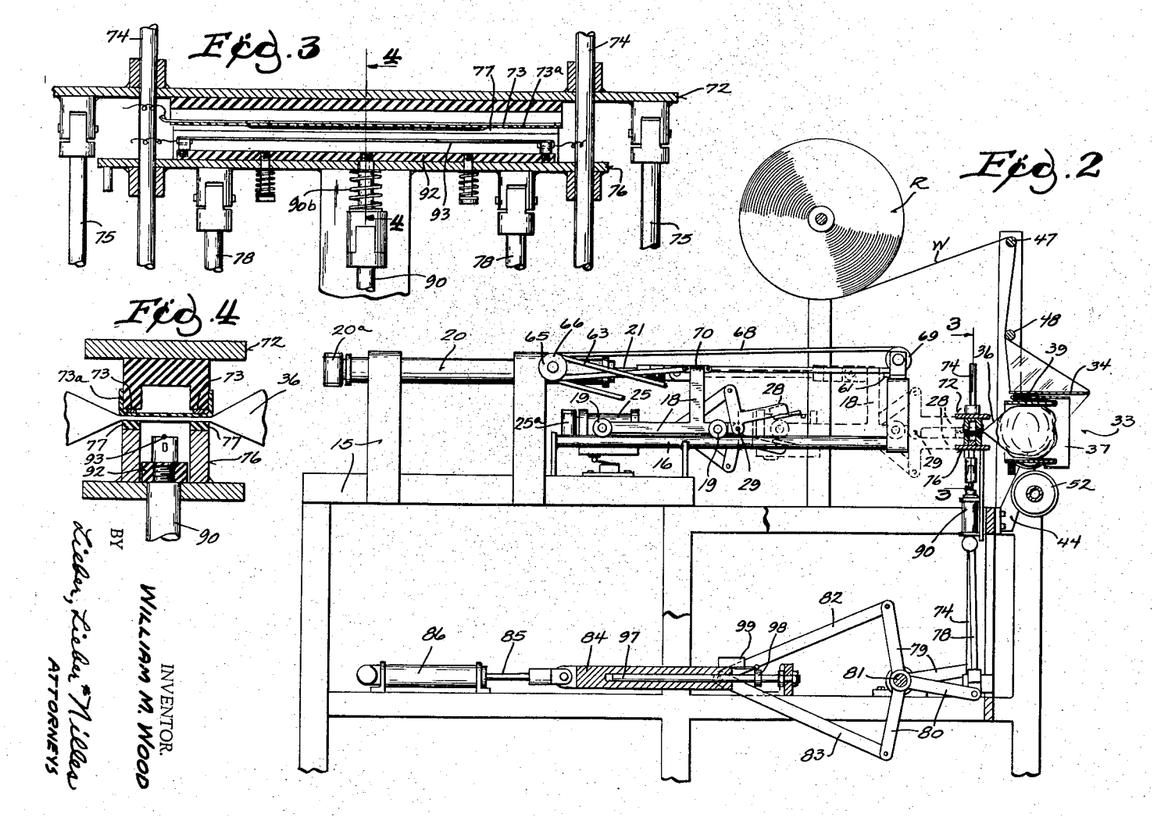
Figure 2 is a view generally similar to Figure 1, but showing the end sealer bars in the closed position, and the gripper carriage and jaws in a forward and closed position, respectively, as indicated by broken lines.
Figure 3 is a sectional view through the sealer bars and taken along the line 3—3 of Figure 2, but on an enlarged scale.
Figure 4 is a sectional view taken on line 4—4 of Figure 3, but on an enlarged scale.
Figures 5, 6, 7:
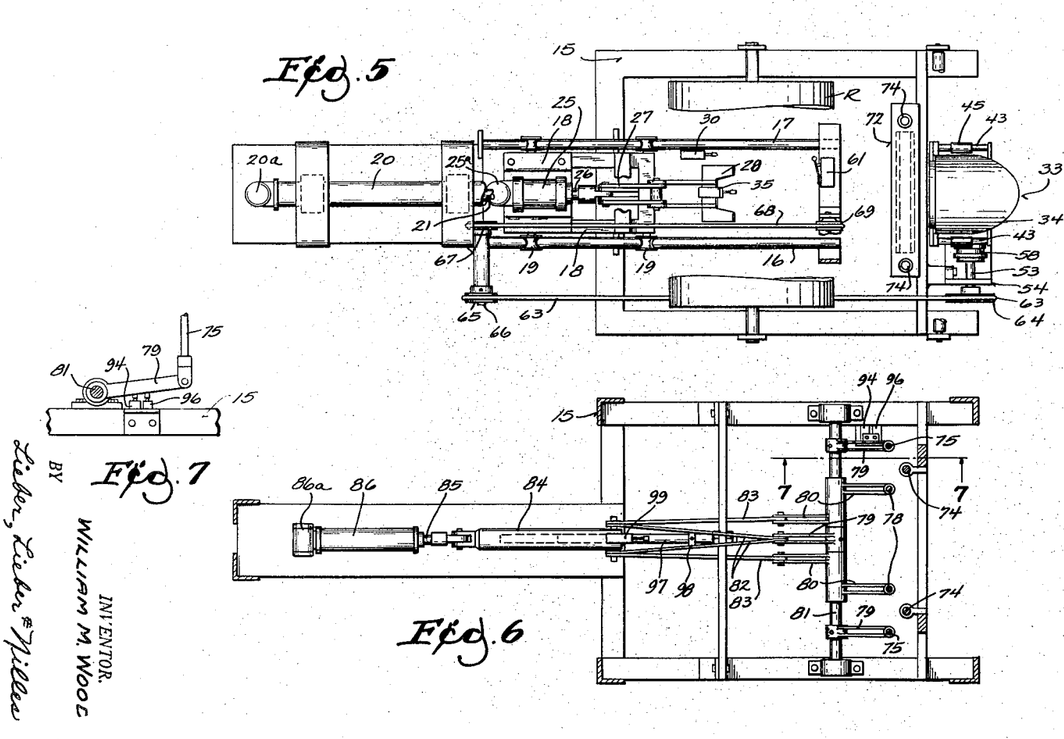
Figure 5 is a plan view of the machine as shown in Figure 1, with certain parts removed, broken away or in section for clarity.
Figure 6 is a horizontal sectional view taken generally along the line 6—6 in Figure 1.
Figure 7 is an enlarged detail view taken along the line 7—7 in Figure 6.

A double-acting air motor 25 is mounted on the carriage and its piston rod 26 is connected by links 27 to a pair of opposing grippers 28 which are pivotally mounted at 29 on the carriage. The motor 25 is extended or contracted by a conventional solenoid-operated valve 25a at the rear end thereof in a well-known manner. Extension of the motor 25 causes the jaws 28 to close (as shown by the broken lines in Figure 2) and contraction of the motor causes the jaws to open, as shown in Figure 1. As shown in Figure 5, a micro-switch 30 is secured to rail 17 and is engaged by the carriage when the latter reaches the end of its forward travel (to the right in Figures 5), and this switch then actuates the solenoid-operated valve 25a of air motor 25 to close the gripper over the end 31 of the thermoplastic tube 36 which extends from the discharge side of the tube-forming mandrel assembly 33.

Another micro-switch 35 is carried at the forward end of one of the grippers and as the operator pushes the commodity into the tube just formed within the mandrel, as will later more fully appear, this switch is actuated to cause the motor 20 to be contracted, thus starting the cycle by the carriage moving rearwardly (to the left in Figure 1), and pulling the web W through the mandrel to form the tube 36. The length of stroke of motor 20 is adjustable in the well-known manner as determined by limit stops (not shown) and by means of which the length of package can be varied.

Another micro-switch 35a is adjustably mounted on frame 15 in any suitable manner, and is actuated by the carriage at the rearward limit of carriage travel. Actuation of this micro-switch, in turn, causes closing movement of the transverse sealing bars (to be described) to thereby form end seals in the tubular member, as will more fully appear hereinafter.

Tube-forming mandrel assembly

The tube-forming mandrel assembly 33 is relatively short in length in comparison to prior art devices. As the web W of thermoplastic material passes through this assembly and is smoothly formed into a tube, it reverses its general direction of travel three times, which contributes to the possibility of utilizing such a short overall length for the forming assembly. The finished tube, as it finally passes through the forming assembly, is located completely within the forming means and therefore the product to be packaged can be placed directly in the tube and does not contact the former.

As shown best in Figures 11 to 16 and 18, this forming means comprises an outer tubular mandrel 34 which tapers rearwardly and downwardly along its sides as defined by the edges 34a. The bottom edges 34b and 34c overlap each other to permit the web W to pass therebetween. A fastening ear 34d is welded to opposite rear sides of mandrel 34. The forming means also includes an intermediate or central tubular member in the form of a collar 37 which is cut away at 37a to receive the sealing wheel to be described. The lower edges 37b and 37c of the collar 37 overlap one another to permit the web W to pass therebetween while being formed into a tube. A fastening ear 38 is welded to opposite sides of collar 37. The innermost member of the forming assembly comprises a tubular collar 39 which has a fastening ear 39a extending from opposite sides. Members 34 and 39 are secured together by screws 42 which fasten their respective ears 34d and 39a together.

Bolt means 43 extends through and is secured to the ears 38 and 39a and thereby rigidly secures the intermediate collar 37 to the other mandrel members.

The three mandrel members 34, 37 and 39 are then supported by the posts 44 which are secured at their lower ends to the main frame. A sleeve 45 is welded to the upper ends of the posts 44 and bolts 43 extend through these sleeves. A set screw 46 holds the mandrel assembly in any one of a plurality of positions in respect to the main frame. The position of the mandrel assembly is determined by the product being bagged, for example, when forming a "wet pack," the mandrel would be pulled out to a position away from the machine.

These mandrel members are preferably formed of stainless steel. The intermediate collar 37 may be coated with Teflon to reduce frictional resistance to movement of the web thereover.

The supply roll R is suitably mounted above the machine and the web W is pulled therefrom and over suitable rollers 47 and 48. After leaving roller 48, the web is pulled generally forwardly and also inwardly from both sides and over the edges 34a of the outer mandrel 34. This web then is drawn rearwardly between mandrel 34 and collar 37, the bottom or outer edges of the web overlapping one another. Upon reaching the rear end of collar 37, the web turns over this rear edge 37d and then travels forwardly between the collars 37 and 39, the bottom or outer edges of the web still being in overlapping relationship. As the tube so formed then reaches the forward edge 39b of collar 39, it again reverses direction and is pulled rearwardly through the inner collar 39 where it emerges at the rear or discharge end as a finished tube.

Longitudinal sealing means

The bottom overlapping portions of the tube have been sealed by the heated rotary sealing wheel 52 (Fig. 9) as they passed between the collars 37 and 39. The wheel 52 presses the overlapped layers of the web W lightly against the resilient leaf spring 51 which is carried on the inner former member 39 and spaced a distance therefrom. This sealing wheel 52 is rotatably mounted on a shaft 53 on frame 54 which, in turn, is swingable about its point 55 of pivotal connection to the main frame. An adjustable stop 56 is carried on the main frame 15 and limits the upper swinging movement of the wheel assembly. Thus the wheel presses the layers of web lightly against the spring to deform the latter slightly but not enough to bottom it against the inner member 39. This light pressure results in a good heat seal without deforming the package. This frame is swingable into and out of engagement with the layers of the web W by means of a well-known double-acting solenoid-operated air motor 57 which is pivotally connected between the frame 54 and main frame 15.

A rotary electrical connection 58 is provided between the shaft 53 and frame 54 for conducting electricity through wires 59 to the heating element 60 in wheel 52, which heats the wheel to thereby heat seal a longitudinal seam along the length of the tube 36 formed by the mandrel-forming assembly. The wheel is swung by the motor 57 away from the tube while the latter is not being pulled through the assembly, to thereby prevent overheating of the tube. The solenoid-operated air motor 57 is actuated by a micro-switch 61 located adjacent the forward end of the carriage tracks. Switch 61 is opened by the carriage when the latter reaches the forward limit of its travel, and when the carriage begins its rearward travel, this switch is closed to actuate motor 57 which, in turn, swings the wheel assembly into its sealing position as will more fully appear hereinafter.

The peripheral speed of the sealing wheel is synchronized with the speed of the carriage, to correlate it with the speed of the tube as the latter is pulled through the mandrel. This is accomplished by the flexible endless belt 63 trained around a pulley 64 on wheel shaft 53 and around a pulley 65 on one end of another shaft 66 carried on the main frame. On the outer end of shaft 66 is secured a pulley 67 over which is trained a flexible belt 68. Belt 68 is also trained over an anchor pulley 69 and is secured to the upper portion 70 of the carriage. Movement of the carriage is reflected through these belts to the sealing wheel.

*End seal and cut-off means*

Means are provided for forming end seals across the width of the tube after a sufficient length of the tube has been pulled through the forming assembly. The seal so formed is actually a double seal having a space between the seals, and cut-off means are also provided for severing the tube between these closely spaced sealed areas, as follows.

The end sealing means includes an upper sealing bar 72 having a pair of spaced-apart heater strips 73 (Fig. 4) through which an electrical heating impulse is passed. A strip 73a of Teflon or other suitable material is drawn over the lower edge of bar 72 to cover the heater strips and prevent their adhesion to the thermoplastic tube.

The bar 72 is vertically reciprocable on the upright guide posts 74 through the links 75 connected at their upper ends to the bar 72. The sealing means also includes a lower sealing bar 76 having spaced-apart resilient material 77 against which the strips are pressed when forming a seal. This lower bar is vertically reciprocable on the guide posts 74 through the links 78 attached at their upper ends to this lower bar.

The lower ends of link 75 are attached to one end of the bell-crank 79. The lower ends of links 78 are attached to one end of bell-crank 80. Cranks 79 and 80 are pivoted at 81 to the main frame and are connected at their other ends to rods 82 and 83, respectively. Rods 82 and 83 are, in turn, connected by member 84 to piston 85 of the double-acting solenoid-operated air motor 86, the latter of which is securely mounted on the main frame.

As previously mentioned, when the carriage 18 reaches the rearward limit of its travel, it actuates micro-switch 35a causing motor 86 to extend thus bringing the sealer bars 72 and 76 together.

A cut-off wire support 92 is vertically slidable within the lower sealer bar 76 and carries a cut-off wire 93. When the sealer bars close together, micro-switches 94 and 96 (Fig. 7) are closed by arm 79. Closing of switch 94 causes strips 73 to be heated by an electrical impulse and closing of switch 96 causes the support 92 to be raised by the single-acting spring-returned air motor 90. This causes the hot cut-off wire to pass between the strips 73, cutting the tube.

Figure 8:
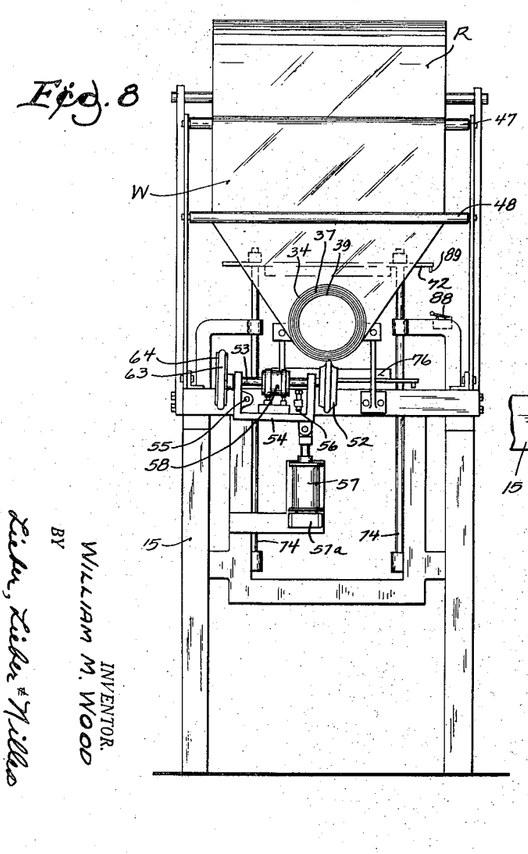
Figure 8 is a front elevational view of the machine as shown in Figure 1, certain parts not shown for clarity in the drawings.

A micro-switch 88 carried on the main frame (Figs. 8 and 10) controls the time during which the heating impulse is sent to the cut-off wire, as follows. This switch is actuated by a stop 89 carried on the upper sealer bar 72 which contacts switch 88 when the upper sealer bar is closed to cause the wire to be heated. Upward return of the upper sealer bar causes the heat to the wire to be stopped.

A fixed guide rod 97 telescopes within member 84 and carries a fixed but adjustable collar 98. The forward end of member 84 carries a micro-switch 99 which is actuated by abutting against the fixed collar 98 when the motor 86 is extended to close the sealer bars. Actuation of switch 99 controls the dwell time during which the sealer bars are together by actuating the timer T. At the end of a predetermined time, the timer causes actuation of the motor 86, causing it to retract and thereby open the sealer bars.

Opening of the sealer bars causes arm 79 to open switch 96 and stop the actuation of motor 90, which then is returned by its spring 90b and thereby lowers the wire to its position within bar 76.

When the sealer bars open, the finished package is completely free and drops onto the discharge chute 100.

*Circuit*

Figures 9, 10:
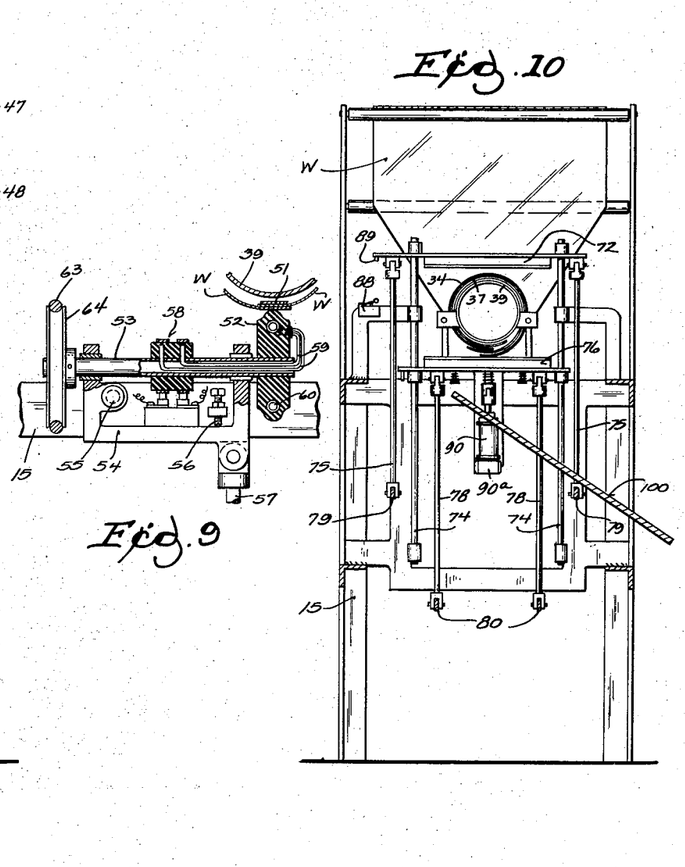
Figure 9 is an enlarged detail view, partially in section, of the longitudinal sealing means as shown in Figure 8.
Figure 10 is a rear elevational view taken generally along the line 10—10 in Figure 1.
Figures 11, 12, 13, 14:
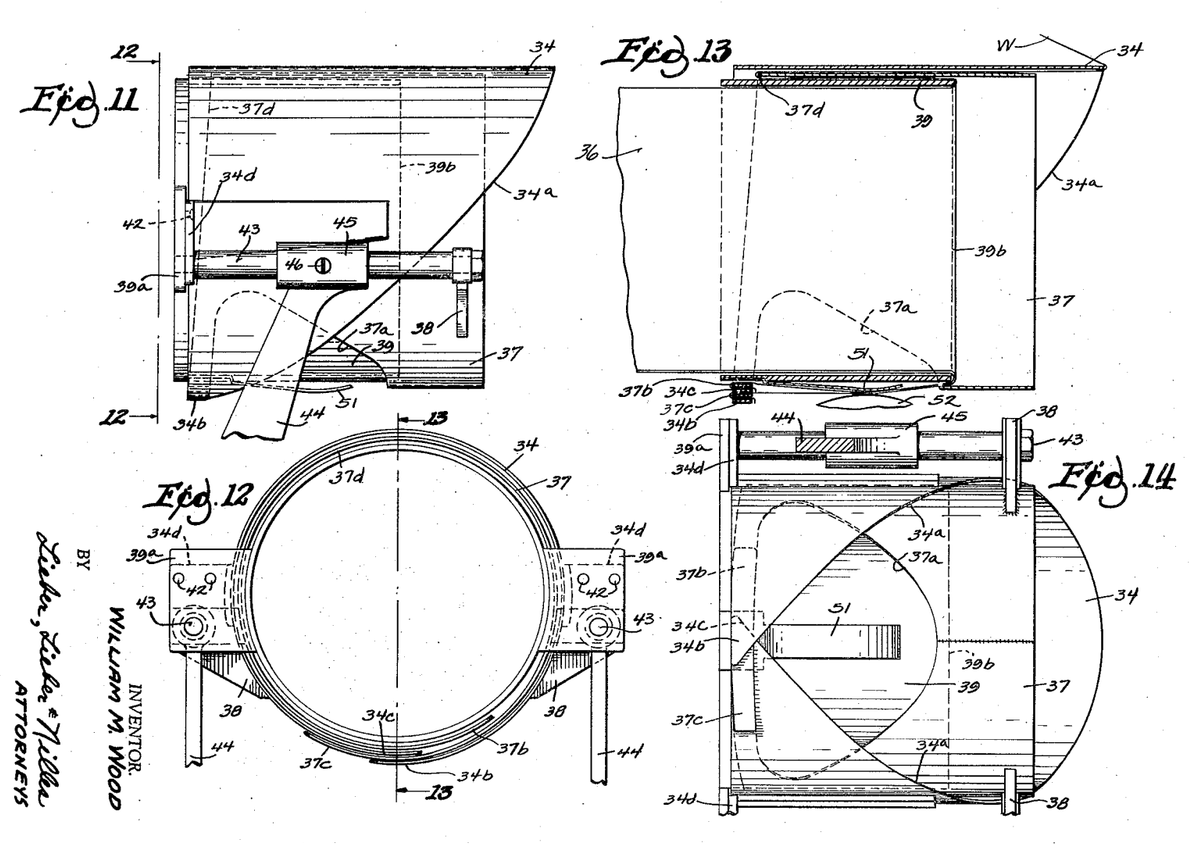
Figure 11 is an enlarged side elevational view of the tube-forming mandrel assembly as shown in Figure 1.
Figure 12 is a rear view of the assembly taken from the line 12—12 of Figure 11.
Figure 13 is a vertical sectional view taken along the line 13—13 in Figure 12 and showing the web as it is formed into a tube as it moves through the assembly.
Figure 14 is a bottom view of the assembly shown in Figures 11-13.
Figure 15:
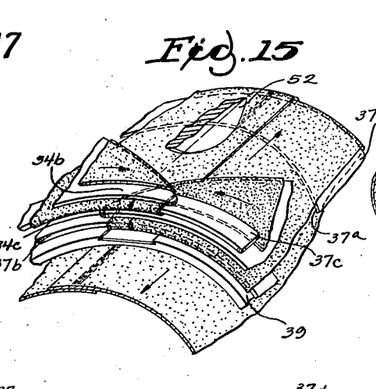
Figure 15 is a fragmentary bottom perspective view of a portion of the mandrel assembly as shown in Figure 14 and showing the web passing therethrough.
Figure 16:
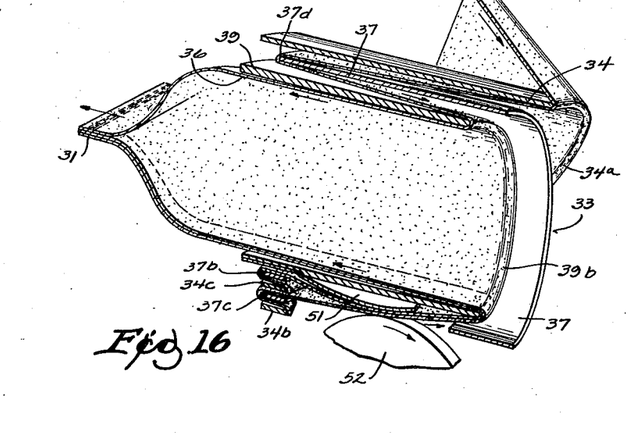
Figure 16 is a fragmentary perspective view in section showing how the web passes through the mandrel assembly in being formed into a tube.
Figure 17:
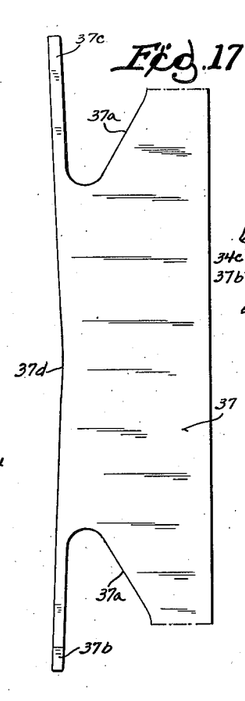
Figures 17 and 18 are layouts of the center and outer mandrel members, respectively, and showing the development thereof.
Figure 18:
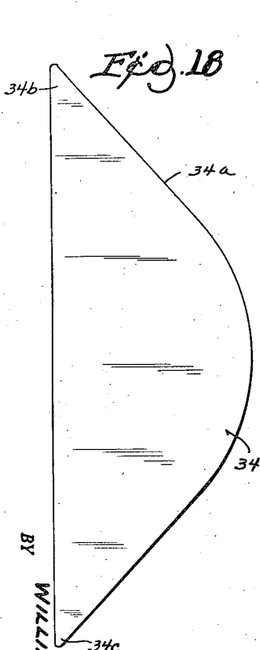
Figure 19:
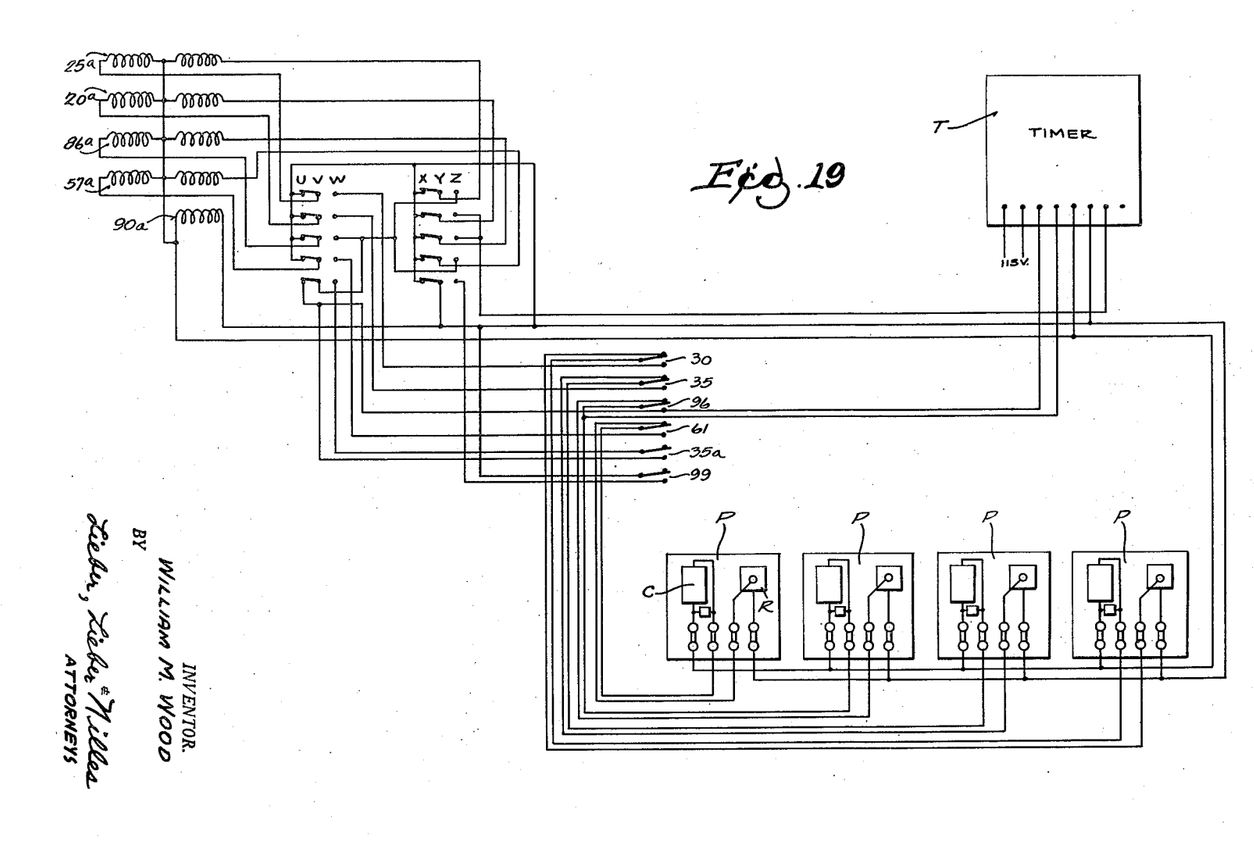
Figure 19 is a diagram of the electrical circuit for the machine shown in the drawings.

The electrical diagram for the machine is shown in Fig. 10 and includes a series of electrical assemblies or "packs" P each comprising a rectifier R and capacitor C which are arranged to provide a momentary impulse of electrical energy through maintained circuits. These packs are of conventional and well-known design and are sometimes referred to as "pulsa-packs." The circuit also includes a conventional timer T and the coils of the various air motor solenoids bear the reference character of their respective air motors together with the letter "a." The coils of these motors are all double to provide for motor operation in either direction, except for motor 90 which is single-acting and spring returned.

The vertical lines of terminals U and X are used for automatic cycling of the machine as described above, wherein the machine progresses through its various stages after the product to be packaged is placed in the thermoplastic tube within the mandrel assembly, thus actuating micro-switch 35 and starting the operation. The vertical line of terminals V and Y are neutral, while the terminals W and Z can be manually switched in for individual operation of any one of the cycles and which permits quick apprehension of a malfunctioning part, such as a faulty micro-switch.

This circuit may operate on a low voltage such as, for example, 8 volts.

Switches 94 and 88 are not in this circuit but would have their own independent and conventional source of electrical energy.

*Summary*

A forming mandrel assembly has been provided which is particularly short in length and which reverses the general direction of movement of the web several times in forming the tube. A smooth feeding of the web results with no creasing or wrinkling thereof, and requiring no previous cutting or folding operations of the web.

The commodity to be packaged is placed directly into the tube of thermoplastic webbing and does not touch or need to be slid along inside the inner forming mandrel member, nor is it necessary for the commodity to travel any appreciable distance in the tube. These are particularly desirable features, especially when packaging wet or leafy produce.

The high speed packaging machine provided by this invention is easily loaded and automatic in its operations which are commenced simply by the loading of the commodity into the mandrel assembly.

Various modes of carrying out the invention are contemplated as being within the scope of the following claims particularly pointing out and distinctly claiming the subject matter which is regarded as the invention.

I claim:

1. A method of working a web into a tube which comprises, feeding the web in one direction toward an outer form, shaping the web about the form during feed of the web in a substantially different direction causing the web to assume a generally tubular shape, reversing the direction of travel of the web and moving the edges of the web in overlapping relationship in forming a tube, and then again reversing the direction of travel of the tube, said web intersecting a common transverse plane while moving in said different and subsequently reversed directions to thereby form said tube within a short length.

2. A method of working a web into a tube which comprises, feeding the web in one direction toward an outer form, shaping the web about the form during feed of the web in a substantially different direction causing the outer edges of the web to overlap thus forming a tube, reversing the direction of travel of the web and increasing the overlap of the edges, and then again reversing the direction of travel of the tube, said web intersecting a common transverse plane while moving in said different and subsequently reversed directions to thereby form said tube within a short length.

3. A method of working a web into a tube which comprises, feeding the web in one direction toward an outer form, shaping the web about the form during feed of the web in a substantially different direction causing the outer edges of the web to overlap thus forming a tube, reversing the direction of travel of the web and increasing the overlap of the edges, sealing said edges together to thereby form a closed tube and prevent further increase in edge overlap, and then again reversing the direction of travel of the tube, said web intersecting a common transverse plane while moving in said different and subsequently reversed directions to thereby form said tube within a short length.

4. A method of working a web into a tube which comprises, feeding the web in one direction toward an outer form, shaping the web about the form during feed of the web in a substantially different direction between said outer form and a center form causing the web to assume a generally tubular shape by overlapping of the edges thereof, reversing the direction of travel of the web by passing it between said center form and an inner form and causing the edges of the web to increase in overlapping relationship in so passing, and then again reversing the direction of travel of the tube by causing it to pass through said inner form.

5. A method of working a web into a tube which comprises, feeding the web in one direction toward an outer form, shaping the web about the form during feed of the web in a substantially different direction between said outer form and a center form causing the web to assume a generally tubular shape by overlapping of the edges thereof, reversing the direction of travel of the web by passing it between said center form and an inner form and causing the edges of the web to increase in overlapping relationship in so passing, sealing said edges together to thereby form a closed tube and prevent further increase in edge overlap, and then again reversing the direction of travel of the tube by causing it to pass through said inner form.

6. A method of working a web into a tube and filling the tube so formed with a commodity to be packaged, which method comprises, feeding the web in one direction toward an outer form, shaping the web about the form during feed of the web in a substantially different direction causing the web to assume a generally tubular shape, reversing the direction of travel of the web and moving the edges of the web into overlapping relationship thereby forming a tube, sealing said edges together, reversing the direction of travel of the tube, stopping movement of the web and tube being formed therefrom, loading a commodity into said tube located within said form, and then continuing the movement of said tube and web.

7. A mandrel assembly for forming webbing into tubular form comprising, an outer former member over which the webbing is passed and reversed in direction of movement, an inner tubular member through which the tubular form webbing is passed, and a center tubular member between said outer and inner members and for reversing the direction of webbing movement between said inner and outer members.

8. A mandrel assembly for forming webbing into tubular form comprising, an outer former member having sides which are inclined downwardly and rearwardly in respect to the general direction from which the webbing is fed thereto, said sides adapted to have said webbing passable thereover and reversed in direction thereby, an inner tubular member through which the finished tubular webbing form is passed, and a center tubular former member between said outer and inner members and for reversing the direction of webbing travel between said outer and inner members.

9. Apparatus for forming webbing into tubular form comprising; an outer former member; an inner tubular member; a center former member between said outer and inner members; and means for feeding the webbing in one direction towards said outer member, then in a substantially different and second direction between said outer and center members, then in a direction opposite to said second direction between said center and inner members and finally again in said second direction within said inner member.

10. A mandrel assembly for forming webbing into tubular form comprising; an outer former member having inclined sides over which said webbing is adapted to pass; an inner tubular member; a center tubular member between said outer and inner members; said center tubular member defining a recess which exposes a portion of the periphery of said inner tubular member; means for feeding the webbing in one direction towards said outer member, then in a substantially different and second direction between said outer and center members, then in a direction opposite to said second direction between said center and inner members and finally again in said second direction within said inner member, and sealing means extending into said recess for sealing the edges of said webbing together as it passes over the periphery of said inner member.

11. Apparatus for forming webbing into tubular form comprising; an outer former member; an inner tubular member; a center former member between said outer and inner members; means for feeding the webbing in one direction towards said outer member and in a substantially different second direction between said outer and center members and in a direction opposite to said second direction between said center and inner members and finally again in said second direction within said inner member, and rotary sealing means adapted to seal together the longitudinal edges of the tube so formed as it passes through said apparatus.

12. Apparatus for forming webbing into tubular form comprising; an outer former member having inclined sides and overlapping bottom edges, an inner tubular member, a center generally tubular member between said outer and inner members and having overlapping bottom edges, and means for pulling said webbing between said outer member and said center member, then reversing the direction of travel of said webbing and pulling it between said center and inner members during which the longitudinal edges of said webbing are in overlapping relationship, and then again reversing said webbing's direction of travel and pulling it through said inner member.

13. A machine for forming and filling a container comprising, a supply of webbing, a forming mandrel assembly for forming said webbing into a tube, said tube having a commodity receiving portion located completely within said assembly, means for intermittently pulling portions of said webbing through said assembly, an actuating member which is adapted to be contacted by the commodity to be packaged as the latter is inserted directly in the tube portion which is formed within said assembly, said member when so contacted causing said means to move away from said assembly and pull the filled tube therefrom.

14. A packaging machine for forming, filling and sealing packages comprising, a supply of webbing, a forming mandrel assembly for forming said webbing into a tube, means for intermittently pulling said webbing through said assembly to thereby form a tube, said tube having a commodity receiving portion located completely within said assembly, means for longitudinally sealing said tube as it is passing through said assembly, an actuating member on said means which is adapted to be contacted by the commodity to be packaged as the latter is inserted in said tube portion within said assembly whereby said member causes said means to move away from said assembly and pull said tube and commodity therethrough, and means for transversely sealing said tube after it has been pulled from said assembly.

15. A packaging machine for forming, filling and sealing packages comprising, a supply of webbing, a forming mandrel assembly for forming said webbing into a tube, means for longitudinally sealing said tube as it is passing through said assembly, reciprocable gripper means for intermittently pulling said webbing through said assembly thereby forming a tube, said tube having a commodity receiving portion located completely within said assembly, an actuating member which is adapted to be contacted by the commodity to be packaged as the latter is inserted in said tube portion, said member when so contacted causing said gripper means to move away from said assembly and pull said tube and commodity therethrough, and means for transversely sealing and cutting said tube after it leaves said assembly to thereby form a package.

16. A packaging machine for forming, filling and sealing packages comprising, a supply of webbing, a generally horizontal forming mandrel assembly for forming said webbing into a tube, said tube having a commodity receiving portion located completely within said assembly, sealing and cutting means for forming a sealed end in said tube, gripper means reciprocable in a generally horizontal direction for pulling said tube by its sealed end through said assembly, an actuating member on said gripper which is adapted to be contacted by the commodity to be packaged as the latter is inserted in said tube portion to thereby cause said gripper means to move away from said assembly and pull said tube and commodity therethrough, and means to operate said sealing and cutting means after said commodity and tube have been pulled through said assembly to thereby form a sealed package.

17. A packaging machine for forming and filling a flexible container comprising, a supply of webbing, a forming mandrel assembly for forming said webbing into a tube, said mandrel assembly comprising a plurality of generally tubular members nested together and between which the webbing passes as it is being formed into a tube, the finished tube passing through the inside of said assembly just prior to its being pulled therefrom, means for pulling said webbing through said assembly, and an actuating member for causing said means to move away from said assembly after a commodity to be packaged has been placed in said finished tube within said assembly to thereby pull said tube and commodity from said assembly.

References Cited in the file of this patent

UNITED STATES PATENTS

| | | |
|---|---|---|
| 1,143,801 | Bates | June 22, 1915 |
| 2,294,220 | Albertson | Aug. 25, 1942 |
| 2,438,811 | Le Sage | Mar. 30, 1948 |
| 2,757,495 | Reichel | Aug. 7, 1956 |